United States Patent
Naruse et al.

(10) Patent No.: US 11,325,616 B2
(45) Date of Patent: May 10, 2022

(54) DRIVING ASSISTANCE APPARATUS AND VEHICLE

(71) Applicant: HONDA MOTOR CO., LTD., Tokyo (JP)

(72) Inventors: Tadashi Naruse, Tokyo (JP); Tatsuya Arikai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/168,510

(22) Filed: Feb. 5, 2021

(65) Prior Publication Data

US 2021/0253124 A1    Aug. 19, 2021

(30) Foreign Application Priority Data

Feb. 13, 2020  (JP) .............................. JP2020-022651

(51) Int. Cl.
*B60W 50/00*       (2006.01)
*B60W 60/00*       (2020.01)
(Continued)

(52) U.S. Cl.
CPC .......... *B60W 60/005* (2020.02); *B60W 40/02* (2013.01); *B60W 40/08* (2013.01);
(Continued)

(58) Field of Classification Search
None
See application file for complete search history.

(56) References Cited

U.S. PATENT DOCUMENTS 5,874,905 A * 2/1999 Nanba .................. G08G 1/0969
                                                                    701/437
6,321,161 B1 * 11/2001 Herbst ............. G08G 1/096827
                                                                    340/905
(Continued)

FOREIGN PATENT DOCUMENTS

EP          3581449 A1    12/2019
JP        2018154216 A    10/2018
(Continued)

OTHER PUBLICATIONS

Japanese Office Action (with partial translation) for Japanese Patent Application No. 2020-022651 dated Jun. 7, 2021.
(Continued)

*Primary Examiner* — Jonathan M Dager
(74) *Attorney, Agent, or Firm* — Thomas | Horstemeyer, LLP

(57) ABSTRACT

An in-vehicle driving assistance apparatus that can execute driving assistance on the basis of any one of a plurality of control modes having mutually-different degrees of driving assistance, the apparatus comprising a receiving unit configured to receive a transition instruction of the control mode, a setting unit configured to set the control mode based on the transition instruction, a determining unit configured to determine whether or not a transition scheme for the control mode indicated by the transition instruction has a pre-registered detail, and a suppressing unit configured to suppress the setting of the control mode by the setting unit when the transition scheme for the control mode indicated by the transition instruction does not have the pre-registered detail.

9 Claims, 6 Drawing Sheets

(51) Int. Cl.
*B60W 50/14* (2020.01)
*B60W 40/02* (2006.01)
*B60W 40/08* (2012.01)
*B60W 50/12* (2012.01)

(52) U.S. Cl.
CPC ............ *B60W 50/12* (2013.01); *B60W 50/14* (2013.01); *B60W 2420/42* (2013.01)

(56) References Cited

U.S. PATENT DOCUMENTS

| | | | | | |
|---|---|---|---|---|---|
| 7,395,152 | B2* | 7/2008 | Watanabe | G01C 21/367 | 701/437 |
| 7,546,206 | B1* | 6/2009 | Miller | G01C 21/00 | 701/120 |
| 7,894,951 | B2* | 2/2011 | Norris | G05D 1/0088 | 701/36 |
| 8,219,309 | B2* | 7/2012 | Nirhamo | G01C 21/3664 | 701/467 |
| 8,385,946 | B2* | 2/2013 | Forstall | G01C 21/3453 | 455/457 |
| 8,452,529 | B2* | 5/2013 | Alten | G01C 21/3484 | 701/410 |
| 8,781,716 | B1* | 7/2014 | Wenneman | G01C 21/3691 | 701/118 |
| 8,983,772 | B2* | 3/2015 | Lee | G01C 21/3676 | 701/431 |
| 9,157,758 | B2* | 10/2015 | Van Seggelen | G06T 11/60 | |
| 9,342,074 | B2* | 5/2016 | Dolgov | G05D 1/0061 | |
| 9,423,262 | B2* | 8/2016 | Nesbitt | G01C 21/3461 | |
| 9,581,460 | B1* | 2/2017 | McNew | B60W 50/08 | |
| 9,663,118 | B1* | 5/2017 | Palmer | B60K 28/06 | |
| 9,688,288 | B1* | 6/2017 | Lathrop | G05D 1/0061 | |
| 9,834,224 | B2* | 12/2017 | Gordon | B60W 30/182 | |
| 10,077,056 | B1* | 9/2018 | Fields | B60W 50/0098 | |
| 10,241,512 | B1* | 3/2019 | Chan | G06K 9/00838 | |
| 10,268,195 | B2* | 4/2019 | Majumdar | G05D 1/0088 | |
| 10,410,250 | B2* | 9/2019 | Singhal | B60W 50/0098 | |
| 10,585,433 | B2* | 3/2020 | Melgar | G05D 1/0246 | |
| 10,732,627 | B1* | 8/2020 | Roberson | B60W 50/0098 | |
| 10,807,527 | B1* | 10/2020 | Mauricia | B60Q 9/00 | |
| 10,829,129 | B2* | 11/2020 | Mimura | B60W 30/182 | |
| 10,837,790 | B2* | 11/2020 | Singhal | G05D 1/0088 | |
| 10,996,671 | B2 | 5/2021 | Zaizen et al. | | |
| 11,106,204 | B2* | 8/2021 | Kaji | G05D 1/0061 | |
| 2002/0082771 | A1* | 6/2002 | Anderson | G01C 21/3484 | 701/423 |
| 2003/0135304 | A1* | 7/2003 | Sroub | G06Q 10/08 | 701/1 |
| 2004/0243307 | A1* | 12/2004 | Geelen | G01C 21/3635 | 342/357.31 |
| 2006/0074553 | A1* | 4/2006 | Foo | G01C 21/367 | 340/995.15 |
| 2006/0220883 | A1* | 10/2006 | Matos | B64D 25/00 | 340/573.1 |
| 2007/0005233 | A1* | 1/2007 | Pinkus | G01C 21/362 | 701/416 |
| 2007/0208498 | A1* | 9/2007 | Barker | G08G 1/0969 | 701/117 |
| 2007/0290839 | A1* | 12/2007 | Uyeki | G01C 21/3694 | 340/539.13 |
| 2007/0293958 | A1* | 12/2007 | Stehle | G06Q 30/0207 | 700/89 |
| 2008/0004802 | A1* | 1/2008 | Horvitz | G01C 21/3415 | 701/533 |
| 2008/0087488 | A1* | 4/2008 | Palmer | B62D 11/06 | 180/308 |
| 2008/0248815 | A1* | 10/2008 | Busch | G06Q 20/3224 | 455/456.5 |
| 2009/0005965 | A1* | 1/2009 | Forstall | G01C 21/3484 | 701/533 |
| 2009/0254272 | A1* | 10/2009 | Hendrey | G01C 21/3415 | 701/414 |
| 2010/0036606 | A1* | 2/2010 | Jones | G09B 29/106 | 705/400 |
| 2010/0121571 | A1* | 5/2010 | Cabral | G08G 1/09675 | 701/414 |
| 2010/0185388 | A1* | 7/2010 | Horvitz | G01C 21/34 | 701/465 |
| 2010/0207787 | A1* | 8/2010 | Catten | G08G 1/096716 | 340/905 |
| 2010/0332119 | A1* | 12/2010 | Geelen | G01C 21/3664 | 701/533 |
| 2011/0082616 | A1* | 4/2011 | Small | G01C 21/3664 | 715/744 |
| 2011/0098917 | A1* | 4/2011 | LeBeau | G06F 1/329 | 707/706 |
| 2011/0125398 | A1* | 5/2011 | Bos | G01C 21/3611 | 709/219 |
| 2011/0224893 | A1* | 9/2011 | Scofield | G08G 1/052 | 701/119 |
| 2011/0241862 | A1* | 10/2011 | Debouk | B60W 50/035 | 340/439 |
| 2012/0098677 | A1* | 4/2012 | Geelen | G01C 21/3685 | 340/932.2 |
| 2012/0123806 | A1* | 5/2012 | Schumann, Jr | G06Q 40/08 | 705/4 |
| 2012/0203424 | A1* | 8/2012 | Filev | B60W 50/00 | 701/36 |
| 2012/0226434 | A1* | 9/2012 | Chiu | G08G 1/096838 | 701/117 |
| 2013/0084847 | A1* | 4/2013 | Tibbitts | H04W 4/48 | 455/419 |
| 2013/0131907 | A1* | 5/2013 | Green | G05D 1/0055 | 701/23 |
| 2013/0131986 | A1* | 5/2013 | Van Seggelen | G01C 21/3664 | 701/533 |
| 2013/0211705 | A1* | 8/2013 | Geelen | G01C 21/36 | 701/410 |
| 2013/0322634 | A1* | 12/2013 | Bennett | H04R 5/00 | 704/274 |
| 2013/0345979 | A1* | 12/2013 | Oostveen | G01C 21/3667 | 701/538 |
| 2014/0156133 | A1* | 6/2014 | Cullinane | B60K 35/00 | 701/23 |
| 2014/0244096 | A1* | 8/2014 | An | G05D 1/0055 | 701/25 |
| 2014/0278070 | A1* | 9/2014 | McGavran | G01C 21/3492 | 701/538 |
| 2014/0358437 | A1* | 12/2014 | Fletcher | G01C 21/3617 | 701/533 |
| 2014/0375462 | A1* | 12/2014 | Biondo | A61B 5/18 | 340/576 |
| 2015/0066282 | A1* | 3/2015 | Yopp | G05D 1/0088 | 701/24 |
| 2015/0066284 | A1* | 3/2015 | Yopp | B60W 50/10 | 701/29.2 |
| 2015/0081162 | A1* | 3/2015 | Mitchell | G06Q 10/06 | 701/32.4 |
| 2015/0134226 | A1* | 5/2015 | Palmer | B60W 50/14 | 701/101 |
| 2015/0149021 | A1* | 5/2015 | Duncan | B60W 30/12 | 701/23 |
| 2015/0160025 | A1* | 6/2015 | Konig | G08G 1/096844 | 701/410 |
| 2015/0276419 | A1* | 10/2015 | Hashem | G01C 21/20 | 701/425 |
| 2015/0314780 | A1* | 11/2015 | Stenneth | B60W 30/00 | 701/23 |
| 2015/0375757 | A1* | 12/2015 | Schiek | B60K 35/00 | 701/23 |
| 2016/0003621 | A1* | 1/2016 | Koenig | G06F 3/0482 | 701/31.4 |
| 2016/0033964 | A1* | 2/2016 | Sato | B60K 28/06 | 701/24 |
| 2016/0041553 | A1* | 2/2016 | Sato | B60W 30/143 | 701/23 |
| 2016/0140872 | A1* | 5/2016 | Palmer | G09B 19/167 | 434/65 |

(56) References Cited

U.S. PATENT DOCUMENTS

| | | | |
|---|---|---|---|
| 2016/0195405 A1* | 7/2016 | Kreifeldt | G01C 21/3484 701/533 |
| 2016/0203422 A1* | 7/2016 | Demarchi | G06F 16/29 705/6 |
| 2016/0280234 A1* | 9/2016 | Reilhac | G05D 1/0061 |
| 2016/0341564 A1* | 11/2016 | Cheng | G01C 21/3641 |
| 2017/0021837 A1* | 1/2017 | Ebina | B60K 28/06 |
| 2017/0057520 A1* | 3/2017 | Letwin | B60W 50/082 |
| 2017/0088144 A1* | 3/2017 | Shibata | G05D 1/0278 |
| 2017/0234689 A1* | 8/2017 | Gibson | G05D 1/0088 701/25 |
| 2017/0349185 A1* | 12/2017 | McNew | B60Q 9/00 |
| 2018/0050698 A1* | 2/2018 | Polisson | B60W 30/182 |
| 2018/0075538 A1* | 3/2018 | Konrardy | B60W 40/09 |
| 2018/0118219 A1* | 5/2018 | Hiei | B60W 40/09 |
| 2018/0162414 A1* | 6/2018 | Palmer | B60K 28/06 |
| 2018/0208211 A1* | 7/2018 | Chiba | B60W 50/082 |
| 2018/0239352 A1* | 8/2018 | Wang | B60W 60/0053 |
| 2018/0284766 A1* | 10/2018 | Minegishi | B60W 50/14 |
| 2018/0284774 A1* | 10/2018 | Kawamoto | G08G 1/16 |
| 2019/0025827 A1* | 1/2019 | Palmer | G05D 1/0061 |
| 2019/0056731 A1* | 2/2019 | Westbrook | G05D 1/0055 |
| 2019/0129416 A1* | 5/2019 | Upmanue | B60W 40/08 |
| 2019/0138003 A1* | 5/2019 | Ming | B60W 50/14 |
| 2019/0146489 A1* | 5/2019 | Zaizen | B60W 40/08 701/42 |
| 2019/0278268 A1* | 9/2019 | Rezaeian | B60W 60/0053 |
| 2020/0272835 A1* | 8/2020 | Cheng | B60W 60/0051 |
| 2020/0290646 A1* | 9/2020 | Safour | B60W 50/16 |
| 2020/0301417 A1* | 9/2020 | Palmer | G07C 5/008 |
| 2020/0331458 A1* | 10/2020 | Nakamura | B60W 40/08 |

FOREIGN PATENT DOCUMENTS

| | | |
|---|---|---|
| JP | 2019064488 A | 4/2019 |
| JP | 2019-089502 A | 6/2019 |
| WO | 2019/130552 A1 | 7/2019 |

OTHER PUBLICATIONS

Decision to Grant for Japanese Patent Application 2020-022651 dated Aug. 3, 2021.

"Levels of Automated Driving", http://www.mlit.go.jp/common/001226541.pdf.

* cited by examiner

FIG. 2

| CONTROL MODE | MAIN DRIVING OPERATOR | MONITORING REQUIRED | DRIVING OPERATION PREPARATION | REMARKS |
|---|---|---|---|---|
| MANUAL MODE L0 | DRIVER | YES | REQUIRED | |
| AUTOMATED DRIVING MODE L1 | DRIVER AND SYSTEM | YES | REQUIRED | |
| AUTOMATED DRIVING MODE L2A | DRIVER AND SYSTEM | YES | REQUIRED | BRANCHING, MERGING, OR THE LIKE IN A PREDETERMINED ROAD |
| AUTOMATED DRIVING MODE L2B | DRIVER AND SYSTEM | YES | NOT REQUIRED | TRAFFIC SCENE IN A PREDETERMINED ROAD |
| AUTOMATED DRIVING MODE L3 | SYSTEM | NO | NOT REQUIRED | NON-TRAFFIC SCENE IN A PREDETERMINED ROAD |

FIG. 4
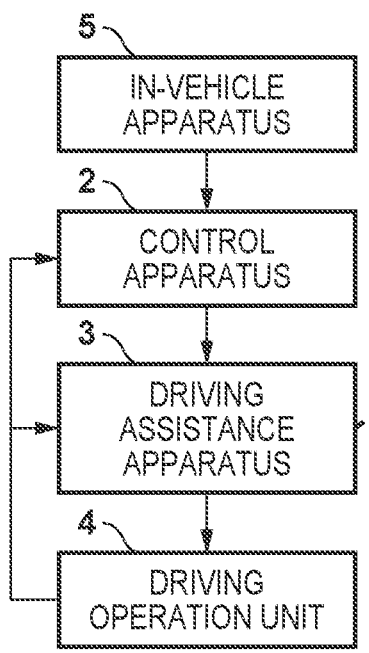
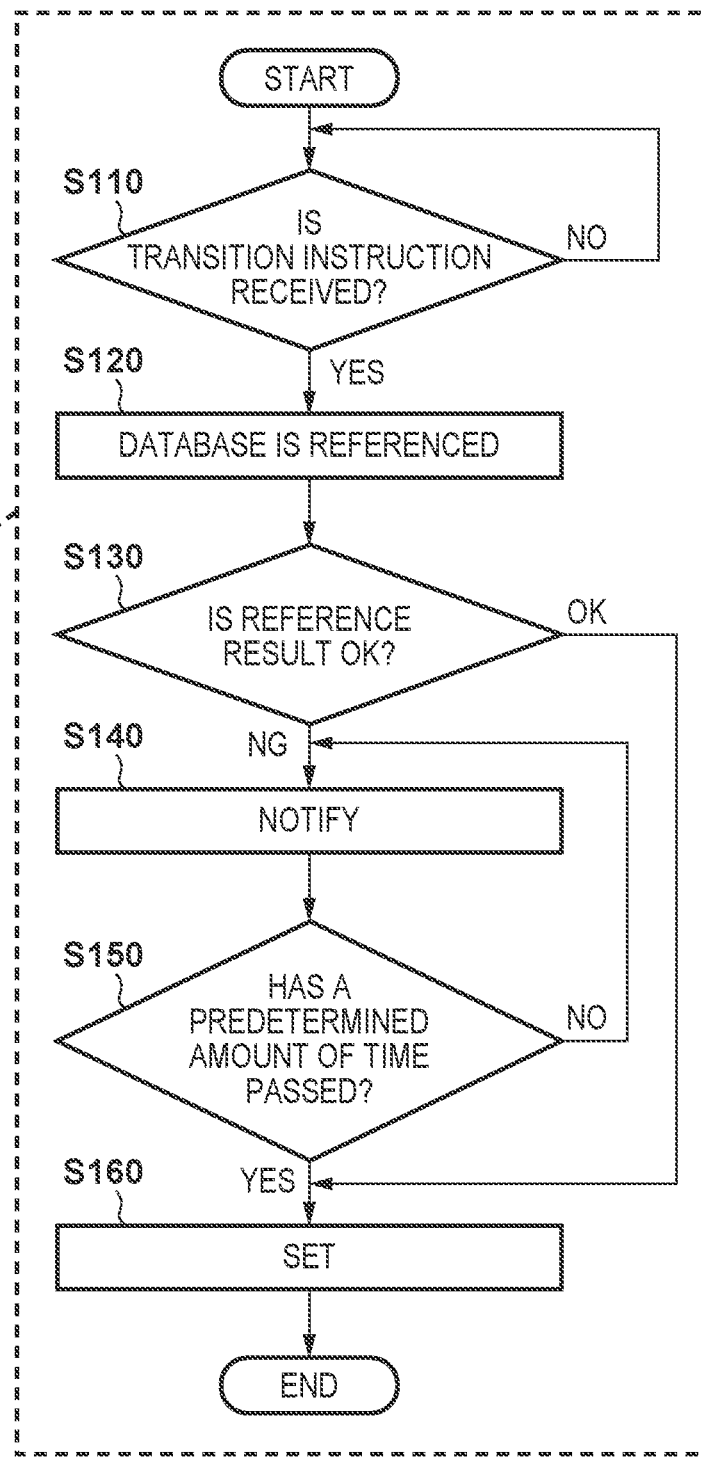

DRIVING ASSISTANCE APPARATUS AND VEHICLE

CROSS-REFERENCE TO RELATED APPLICATION(S)

This application claims priority to and the benefit of Japanese Patent Application No. 2020-022651 filed on Feb. 13, 2020, the entire disclosure of which is incorporated herein by reference.

BACKGROUND OF THE INVENTION

Field of the Invention

The present invention relates mainly to a driving assistance apparatus.

Description of the Related Art

Some vehicles include electronic control units (ECUs) that assist driving by executing some or all of driving operations, such as acceleration, braking, and steering, in place of the driver. Such a vehicle travel state is generally referred to as "automated driving". In automated driving, a situation where ECUs execute some of the driving operations is called "partially-automated driving" or the like, while a situation where ECUs execute all of the driving operations is called "fully-automated driving" or the like.

The aforementioned automated driving is divided into several control states (which may also be referred to as "levels") depending on the degree to which the ECUs assist in driving (see "Levels of Automated Driving", http://www.mlit.go.jp/common/001226541.pdf). Here, when transitioning from one control state to another control state, it may take a significant amount of time to prepare the driver, switch control modes of the ECUs, prepare the settings of other in-vehicle apparatuses involved therewith, and the like, for example. As an example of measures for responding to this issue, Japanese Patent Laid-Open No. 2019-64488 discloses a technique in which when an automated driving mode is canceled (i.e., when transitioning to a manual driving mode), the driving goes through a partially-automated driving mode that provides a relatively low level of driving assistance.

On the other hand, as the content of driving assistance becomes more diverse, individual automobile manufacturers are sometimes dividing such control states into even finer levels, which may complicate the schemes for transitions between control states (e.g., settings for transition conditions and the like). Thus what is needed is a technique useful for improving usability in such vehicles.

SUMMARY OF THE INVENTION

An exemplary object of the present invention is to make it relatively easy to achieve both a diversification of the content of driving assistance and an improvement of the usability of a vehicle.

One of the aspects of the present invention provides an in-vehicle driving assistance apparatus that can execute driving assistance on the basis of any one of a plurality of control modes having mutually-different degrees of driving assistance, the apparatus comprising a receiving unit configured to receive a transition instruction of the control mode, a setting unit configured to set the control mode based on the transition instruction, a determining unit configured to determine whether or not a transition scheme for the control mode indicated by the transition instruction has a pre-registered detail, and a suppressing unit configured to suppress the setting of the control mode by the setting unit when the transition scheme for the control mode indicated by the transition instruction does not have the pre-registered detail.

BRIEF DESCRIPTION OF THE DRAWINGS

FIG. 2 is a diagram illustrating an example of the classification of automated driving control states based on the content of driving assistance.

FIG. 4 is a flowchart illustrating an example of control content of a driving assistance apparatus.

DESCRIPTION OF THE EMBODIMENTS

Embodiments will be described hereinafter in detail, with reference to the accompanying drawings. It should be noted that the following embodiments are not intended to limit the scope of the appended claims, and that not all the combinations of features described in the embodiments are necessarily essential to the invention. Two or more of the plurality of features described in the embodiments may be combined as desired. Additionally, the same or similar configurations are given the same reference signs, and redundant descriptions thereof will be omitted.

First Embodiment

Figure 1:
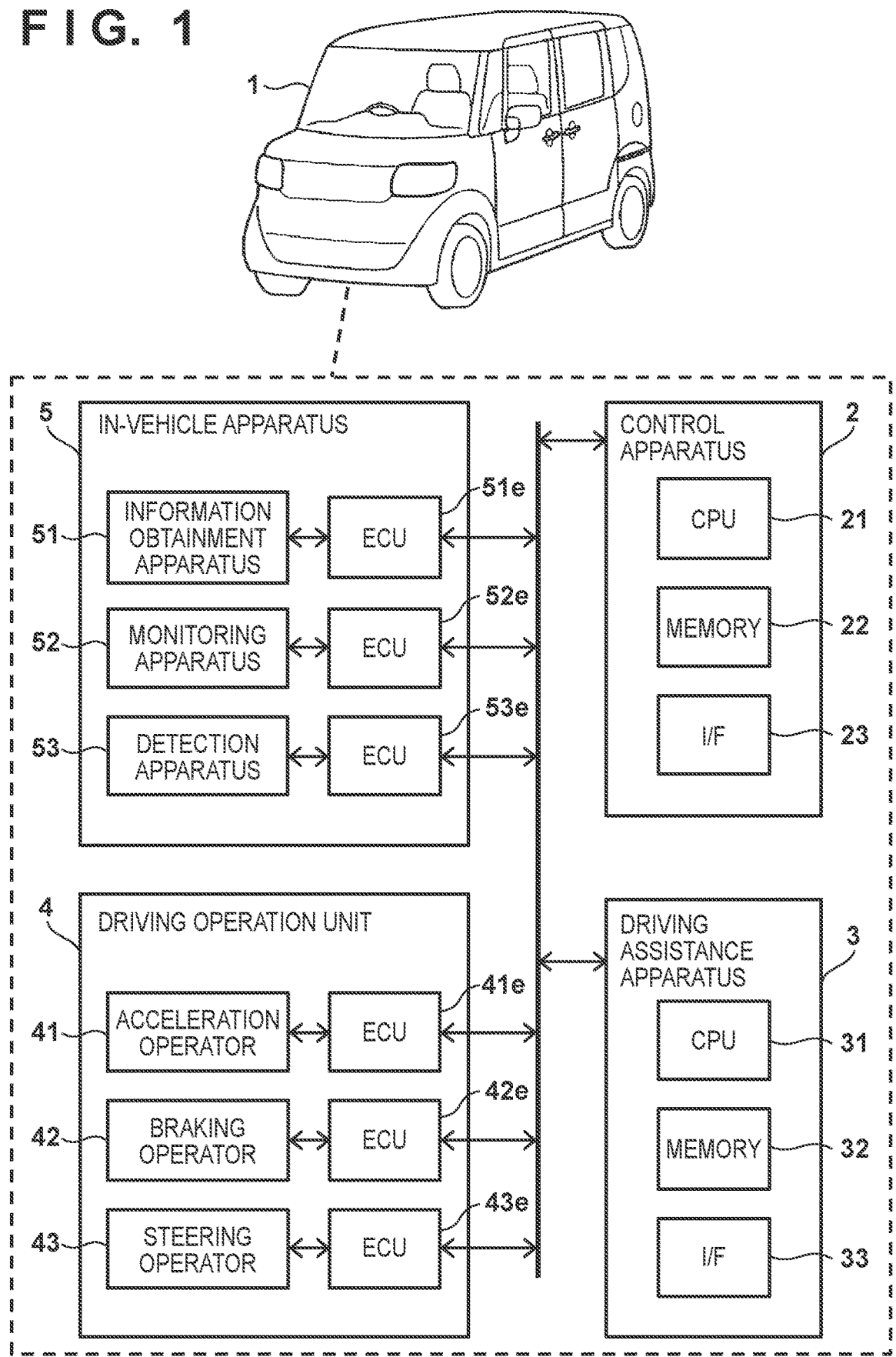
FIG. 1 is a diagram illustrating the configuration of a vehicle according to an embodiment.

FIG. 1 is an overall perspective view of a vehicle 1 according to a first embodiment, and a block diagram illustrating part of a system configuration of the vehicle 1. The vehicle 1 includes a control apparatus 2, a driving assistance apparatus 3, a driving operation unit 4, and in-vehicle apparatuses 5, and these elements are capable of communicating with each other through electronic control units (ECUs) (described later). Although the vehicle 1 is assumed to be a four-wheeled vehicle in the present embodiment, the number of wheels is not limited to this example.

The control apparatus 2 is an ECU for controlling the overall system of the vehicle 1, and includes a CPU 21, memory 22, and an external communication interface 23. The control apparatus 2 may be implemented as a system controller.

The driving assistance apparatus 3 is an ECU for performing some or all of driving operations of the vehicle 1 (mainly acceleration, braking, and steering) in place of the driver, and includes a CPU 31, memory 32, and an external communication interface 33. In the following descriptions, the driving operations performed by the driving assistance apparatus 3 will be referred to as "driving assistance", and such a travel state of the vehicle 1 will be referred to as "automated driving".

The driving operation unit 4 is configured to be capable of implementing the above-described driving operations, and in the present embodiment, includes an acceleration operator 41, a braking operator 42, a steering operator 43, as well as corresponding ECUs 41e to 43e.

The acceleration operator 41 is typically an accelerator pedal, but may be an operator which uses a different operation system (e.g., a lever). The ECU 41e outputs, to the control apparatus 2, a signal based on an operation amount by which the driver operates the acceleration operator 41, or performs drive control of the acceleration operator 41 on the basis of a signal received from the driving assistance apparatus 3.

The braking operator 42 is typically a brake pedal, but may be an operator which uses a different operation system. The ECU 42e outputs, to the control apparatus 2, a signal based on an operation amount by which the driver operates the braking operator 42, or performs drive control of the braking operator 42 on the basis of a signal received from the driving assistance apparatus 3.

The steering operator 43 is typically a steering wheel, but may be an operator which uses a different operation system. The ECU 43e outputs, to the control apparatus 2, a signal based on an operation amount by which the driver operates the steering operator 43, or performs drive control of the steering operator 43 on the basis of a signal received from the driving assistance apparatus 3.

The in-vehicle apparatuses 5 are other electrical apparatuses which can be mounted in the vehicle 1 and which are different from the aforementioned elements 2 to 4, and in the present embodiment, include an information obtainment apparatus 51, a monitoring apparatus 52, a detection apparatus 53, and corresponding ECUs 51e to 53e.

The information obtainment apparatus 51 obtains information indicating a travel environment of the vehicle 1. "Travel environment" refers to details pertaining to the travel path of the vehicle 1, e.g., attributes of the travel path (e.g., whether or not the travel path is in a zone where driving assistance by the driving assistance apparatus 3 is permitted). Position information of the vehicle 1, map information, and the like can be given as examples of the information indicating the travel environment. A communication device capable of implementing road-to-vehicle communication and vehicle-to-vehicle communication, a Global Positioning System (GPS) sensor, and the like can be given as examples of the information obtainment apparatus 51. The ECU 51e outputs a result of the obtainment by the information obtainment apparatus 51 to the control apparatus 2.

The monitoring apparatus 52 monitors the surrounding environment of the vehicle 1. "Surrounding environment" refers to details pertaining to objects around the vehicle 1, e.g., whether or not an object is present, the position and attributes thereof, and the like. "Object" refers to a subject for warnings, with which the vehicle 1 is to avoid coming into contact. Other vehicles, pedestrians, on-road installations, and the like can be given as examples. An image capturing apparatus (a camera including a CMOS image sensor or the like), a rangefinding apparatus (millimeter wave radar, Light Detection and Ranging (LiDAR), or the like), and so on can be given as examples of the monitoring apparatus 52. The ECU 52e outputs a result of the monitoring by the monitoring apparatus 52 to the control apparatus 2.

The detection apparatus 53 detects driving operations by an occupant. For example, if, when the driving assistance apparatus 3 is performing driving operations, the occupant intervenes in the driving operations, the detection apparatus 53 can detect that intervention. A pressure-sensitive sensor, an electrostatic capacitance sensor, a torque sensor, and the like can be given as examples of the detection apparatus 53. The ECU 53e outputs a result of the detection by the detection apparatus 53 to the control apparatus 2.

The control apparatus 2 performs predetermined computational processing on the basis of the outputs from the aforementioned ECUs 51e to 53e, and outputs control signals to the driving assistance apparatus 3 as necessary. As a result, the driving assistance apparatus 3 can execute driving assistance corresponding to the control signals.

To summarize, the vehicle 1 has an automated driving function in which the driving assistance apparatus 3 executes some or all of the driving operations as driving assistance. In other words, the vehicle 1 can be said to have a normal driving mode, in which the driver him or herself substantially performs all of the driving operations, as well as an automated driving mode, in which the driving assistance apparatus 3 performs some or all of the driving operations, as operating modes. In the automated driving mode, the control apparatus 2 outputs control signals to the driving assistance apparatus 3 on the basis of signals received from the in-vehicle apparatuses 5, and the driving assistance apparatus 3 performs driving assistance by performing drive control of the driving operation unit 4 on the basis of the control signals.

Here, Adaptive Cruise Control (ACC), a Lane Keep Assist System (LKAS), and the like can be given as examples of driving assistance performed when the driving assistance apparatus 3 executes some of the driving operations. In ACC, driving operations are performed so that the vehicle 1 follows a vehicle in front while maintaining a given following distance. In a LKAS, driving operations are performed so that the vehicle 1 does not depart from lane dividing lines.

Note that like the apparatuses 2 and 3, the ECUs 41e to 43e and the ECUs 51e to 53e are assumed to be configured including CPUs, memory, and the like.

The present embodiment assumes that the individual functions of the control apparatus 2 and the driving assistance apparatus 3, as well as the ECUs 41e to 43e and the ECUs 51e to 53e (which may be referred to collectively as an "ECU group" hereinafter), are realized by the CPUs executing predetermined programs, but the functions may instead be implemented by semiconductor devices such as Application Specific Integrated Circuits (ASICs). In other words, the individual functions of the ECU group described in the present specification can be implemented by either hardware or software.

The system configuration of the vehicle 1 is not limited to this example, and may be changed within a scope that does not depart from the essential spirit thereof. For example, the functions of some of the elements in the aforementioned ECU group may be provided in other elements, e.g., some of the functions of the ECU 41e may be implemented by the driving assistance apparatus 3, or some of the functions of the driving assistance apparatus 3 may be implemented by the control apparatus 2.

As illustrated in FIG. 2, the automated driving of the vehicle 1 is divided into several control states (these may also be called "levels" or the like) depending on the degree of the driving assistance performed by the driving assistance apparatus 3. In other words, the driving assistance apparatus 3 has a plurality of control modes in which the degrees of the driving assistance differ from each other. In the present embodiment, these modes are modes L0, L1, L2A, L2B, and L3.

In FIG. 2, the stated modes L0, L1, L2A, L2B, and L3 are denoted under the "control mode" item, and the following are denoted under the corresponding items of "main driving operator", "monitoring requirement Y/N", "driving operation preparation requirement Y/N", and "notes":

the item "main driving operator" indicates the entity primarily executing the driving operations (mainly acceleration, braking, and steering), and "driver" (including an occupant capable of accessing the driving operation unit 4, when the driver is not currently performing the driving operations due to automated driving mode) and/or "system" (i.e., the driving assistance apparatus 3) are denoted in the corresponding column;

the item "monitoring requirement Y/N" indicates whether or not the driver is required to monitor the surrounding environment of the vehicle 1, and "yes" or "no" is denoted in the corresponding column;

the item "driving operation preparation requirement Y/N" indicates whether or not the driver can start driving operations immediately or in a relatively short time using the driving operation unit 4, and "yes" or "no" is denoted in the corresponding column; and additional details of the corresponding control mode are denoted in the item "notes", and examples in which the corresponding control mode is permitted to be used are indicated in FIG. 2.

In mode L0, the driving assistance apparatus 3 substantially does not perform any of the driving operations (substantially does not perform driving assistance). In modes L1, L2A, and L2B, the driving assistance apparatus 3 performs some of the driving operations. In mode L1, the driving assistance apparatus 3 executes relatively low-level driving assistance (e.g., ACC or LKAS). In mode L2A, the driving assistance apparatus 3 executes relatively high-level driving assistance (e.g., both ACC and LKAS), under conditions which are relatively limited from the driver's perspective (see the "notes" column in FIG. 2). In mode L2B, the driving assistance apparatus 3 executes relatively high-level driving assistance (e.g., both ACC and LKAS), under conditions which are relatively relaxed from the driver's perspective (see the "notes" column in FIG. 2). Finally, in mode L3, the driving assistance apparatus 3 executes substantially all of the driving operations under conditions which are further relaxed from the driver's perspective (see the "notes" column in FIG. 2).

As such, the following applies for mode L0.
Main driving operator: driver
Monitoring required: yes
Driving operation preparation: required
The following applies for modes L1 and L2A.
Main driving operator: driver & system
Monitoring required: yes
Driving operation preparation: required
The following applies for mode L2B. Main driving operator: driver & system
Monitoring required: yes
Driving operation preparation: not required
The following applies for mode L3. Main driving operator: system
Monitoring required: no
Driving operation preparation: not required For example, in a travel segment in which the use of mode L2B is permitted, when there is no traffic jam in the stated travel segment, the driving assistance apparatus 3 can perform driving assistance in mode L2B on the basis of control signals from the control apparatus 2 that has obtained, from the in-vehicle apparatuses 5, information indicating the lack of a traffic jam in the stated segment. Additionally, for example, in a travel segment in which the use of mode L3 is permitted, regardless of whether or not there is a traffic jam in the stated travel segment, the driving assistance apparatus 3 can perform driving assistance in mode L3 on the basis of control signals from the control apparatus 2 that has obtained, from the in-vehicle apparatuses 5, information indicating the state of traffic jams in the stated segment.

Mode L0 may be referred to as a "manual mode", and in this mode, the operating mode of the vehicle 1 is the normal driving mode. In modes L1, L2A, and L2B, the operating mode of the vehicle 1 can be called a "conditional partially-automated driving mode". In mode L3, the operating mode of the vehicle 1 can be called a "conditional automated driving mode".

Although modes L0, L1, L2A, L2B, and L3 are given as examples of the control modes of the driving assistance apparatus 3 here, it should be noted that the driving assistance apparatus 3 may further include other modes (e.g., mode L4, in which the degree of driving assistance is greater than mode L3).

Incidentally, when the aforementioned automated driving transitions from the current control state to another control state, i.e., when the driving assistance apparatus 3 transitions from a given mode to another mode, an amount of time corresponding to a preparation period may be necessary.

For example, according to this example (see FIG. 2), when transitioning from mode L3 (monitoring required: no; driving operation preparation: not required) to mode L2B (monitoring required: yes; driving operation preparation: not required), there will be at least a change in the monitoring requirement for the driver. It can therefore be said that a corresponding amount of time should be provided at the time of this transition. Likewise, for example, when transitioning from mode L2B (monitoring required: yes; driving operation preparation: not required) to mode L1 (monitoring required: yes; driving operation preparation: required), there will at least be a change in whether or not driving operation preparation is required of the driver. It can therefore be said that a corresponding amount of time should be provided at the time of this transition. Furthermore, a corresponding amount of time can be considered to be necessary when switching the control mode of the driving assistance apparatus 3.

It can therefore be said that the driving assistance apparatus 3 cannot freely transition from one of a plurality of control modes to another, and that there are cases where predetermined restrictions are placed on such transitions. Note that the aforementioned changes imposed on the driver when the control mode transitions are new actions or cautions required to be taken by the driver, and will be referred to simply as "changes imposed on the driver" in the following descriptions. For example, when relatively few new actions or cautions are required to be taken by the driver when the control mode transitions, the changes imposed on the driver are relatively small and the time required to change the settings on the driving assistance apparatus 3 side is relatively short, and thus the transition can be said to be relatively easy.

Figure 3:
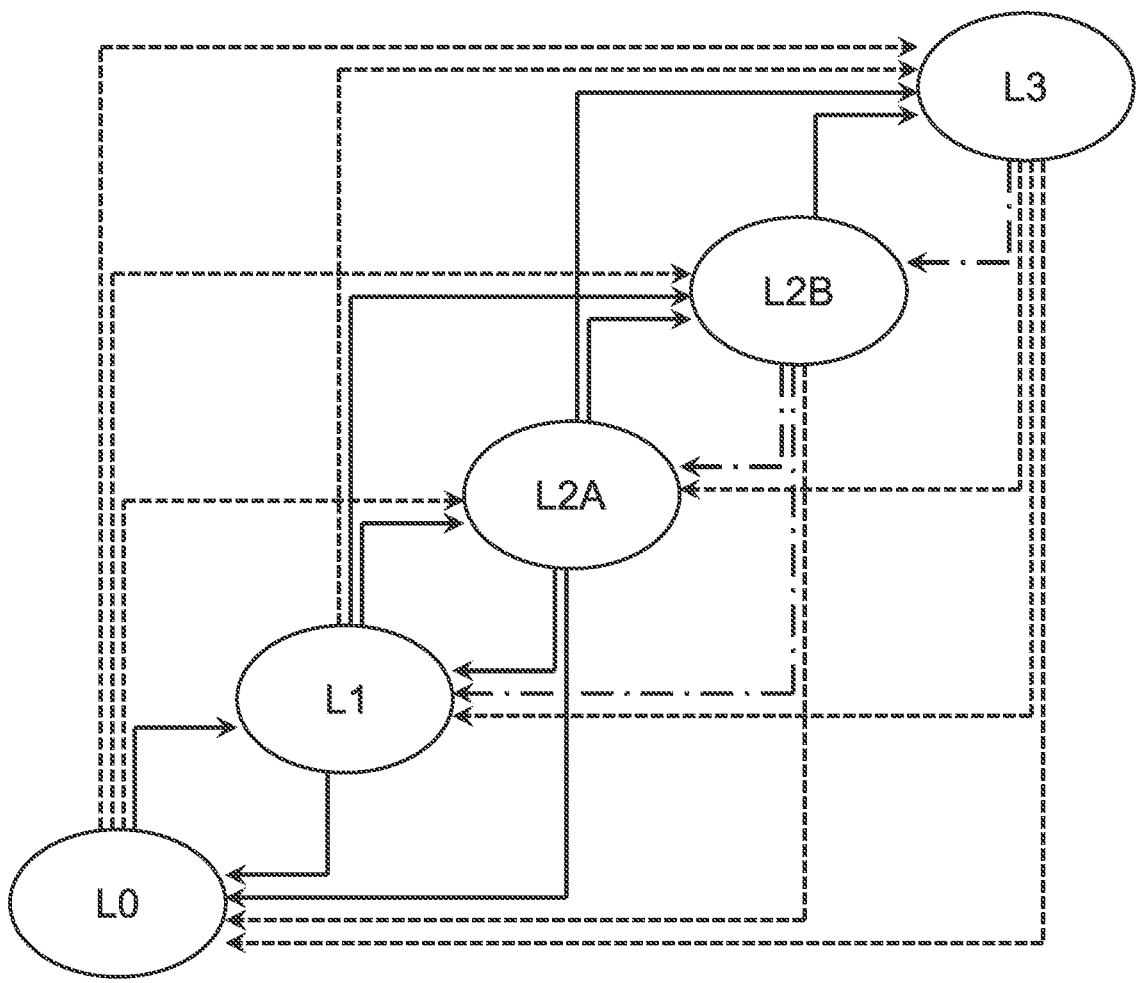
FIG. 3 is a state transition diagram illustrating an example of control mode transition schemes.

FIG. 3 is a state transition diagram illustrating conditions when transitioning among modes L0, L1, L2A, L2B, and L3. In FIG. 3, the solid line arrows indicate that the control mode transition is easy (safe) (i.e., the control mode transition can be implemented quickly). The dot-dash line arrows indicate that the control mode transition is relatively easy (the changes imposed on the driver are relatively small and the control mode transition can be implemented relatively quickly). Finally, the broken line arrows indicate that the control mode transition is relatively difficult (the changes imposed on the driver are relatively large and the control mode transition will take a significant amount of time).

Here, whether a control mode transition from a mode having a greater degree of driving assistance to a mode having a lesser degree of driving assistance is easy or difficult can generally be classified into a plurality of levels, due to different burdens being placed on the driver depending on the degree of actions or caution newly required of the driver. On the other hand, a control mode transition from a mode having a lesser degree of driving assistance to a mode having a greater degree of driving assistance lightens the burden from the driver's perspective, and is therefore generally relatively easy.

For example, when transitioning from L2A (monitoring required: yes; driving operation preparation: required) to L1 (monitoring required: yes; driving operation preparation: required), the changes imposed on the driver are relatively small, and the time required to change the settings on the driving assistance apparatus 3 is also relatively short. The transition can therefore be said to be relatively easy (the solid line arrow).

As another example, when transitioning from L3 (monitoring required: no; driving operation preparation: not required) to L1 (monitoring required: yes; driving operation preparation: required), the changes imposed on the driver are relatively large, and the time required to change the settings on the driving assistance apparatus 3 is also relatively long. The transition can therefore be said to be relatively difficult (the broken line arrow).

As yet another example, when transitioning from L1 (monitoring required: yes; driving operation preparation: required) to L2A (monitoring required: yes; driving operation preparation: required), the changes imposed on the driver are relatively small, and the time required to change the settings on the driving assistance apparatus 3 is also relatively short. The transition can therefore be said to be relatively easy (the solid line arrow).

As yet another example, when transitioning from L1 (monitoring required: yes; driving operation preparation: required) to L3 (monitoring required: no; driving operation preparation: not required), the burden on the driver is greatly lightened, but the time required to change the settings on the driving assistance apparatus 3 is relatively long. The transition can therefore be said to be relatively difficult (the broken line arrow).

In other words, when transitioning among a plurality of control modes, there are situations where restrictions should be imposed due to preparation periods for the driver and/or the driving assistance apparatus 3, and thus predetermined conditions may be required to be met for some of the transitions.

On the other hand, to ensure that these items can be implemented appropriately, the system configuration of the vehicle 1 should be designed so that unexpected transitions between control modes do not occur. Here, "unexpected transition" (called an "unexpected mode transition" hereinafter) refers to a transition when the control mode transition instruction (the signal thereof) is unexpected. Fluctuations in signal values caused by external noise from software errors, program bugs, and the like are examples of conceivable causes. Note that when an unexpected mode transition has occurred, the corresponding signal values, details of the programs currently running, and so on are recorded in a predetermined recording medium (e.g., the memory 22 or the like), and can then be referred to when correcting the design mentioned above.

As described with reference to FIG. 1, in the automated driving mode, the control apparatus 2 outputs control signals to the driving assistance apparatus 3 on the basis of signals received from the in-vehicle apparatuses 5, and the driving assistance apparatus 3 performs driving assistance by performing drive control of the driving operation unit 4 on the basis of the control signals. To rephrase in terms of the driving assistance apparatus 3, upon receiving a control signal instructing a control mode transition from the control apparatus 2, the driving assistance apparatus 3 transitions the control mode in response and changes the state of the drive control/the degree of the driving assistance by the driving operation unit 4. Accordingly, when an unexpected fluctuation has arisen in the value of a signal from the in-vehicle apparatuses 5 to the control apparatus 2 and/or a signal from the control apparatus 2 to the driving assistance apparatus 3, an unexpected mode transition occurs in the driving assistance apparatus 3.

FIG. 4 is a flowchart illustrating a flow of the aforementioned signals from the in-vehicle apparatuses 5 to the driving operation unit 4 in response to control mode transitions, as well as the details of control performed by the driving assistance apparatus 3 at that time. To summarize the flowchart, it is determined whether or not a control mode transition scheme indicated by a transition instruction from the control apparatus 2 has pre-registered (or permitted) details, and when the transition scheme does not have pre-registered details, a transition based on the transition instruction is suppressed.

As described earlier, if, when the driving assistance apparatus 3 is performing driving operations, the occupant intervenes in the driving operations, the detection apparatus 53 can detect that intervention. In this case, a signal based on that operation amount is output from the driving operation unit 4 to the control apparatus 2 (and additionally to the driving assistance apparatus 3).

In step S110 (called simply "S110" hereinafter; the same applies to the other steps as well), it is determined whether or not a control mode transition instruction (which may be called simply a "transition instruction" hereinafter) has been received from the control apparatus 2. If a transition instruction has been received, the sequence moves to S120, and if not, the sequence returns to S110.

In S120, a database is referenced for the transition instruction from the control apparatus 2, and it is verified whether the control mode transition scheme indicated by the transition instruction has pre-registered details. When the transition scheme has pre-registered details, it is assumed that the transition scheme is appropriate. Although the present embodiment assumes that the database is stored in the memory 32 in advance, as another embodiment, the database may be made referable through external communication using the interface 33.

In the present embodiment, there are three or more control modes, and for example, permissive conditions for transitioning from each of the three or more control modes to other control modes can be set in the stated database. For example, it is necessary to pass through mode L2B when transitioning from mode L3 to mode L1, and direct transitions from mode L3 to mode L1 are not permitted. In other words, the permissive conditions include whether or not it is possible to transition from one of the plurality of control modes to another.

In S130, when the result of the verification in S120 is OK (when the transition instruction is appropriate), the sequence moves to S160, whereas when the result is NG (when the transition instruction is not appropriate), the sequence moves to S140. For example, in the foregoing situation, when the current control mode of the driving assistance apparatus 3 is mode L3 and the transition instruction received in S110 indicates a transition to mode L1, the result of the verification is NG (e.g., the transition instruction is not appropriate).

In S140, the driver (this includes an occupant capable of accessing the driving operation unit 4, in the event that the driver is not currently performing driving operations) is notified that the result of the verification in S120 is NG. As a result of this notification, the driver can recognize that the control mode transition will take place, and can prepare for driving quickly as necessary. The sequence then moves to S150.

In S150, it is determined whether or not a predetermined amount of time has passed. If the predetermined amount of time has passed, the sequence moves to S160, and if not, the sequence returns to S140.

In S160, the control mode indicated by the transition instruction received in S110 is set. In other words, when the received transition instruction is not appropriate (i.e., when the result of the verification in S120 is NG), the aforementioned notification is provided to the driver continuously until the predetermined amount of time has passed. The control mode indicated by the transition instruction being set is restricted as a result (see S140 to S150). After the predetermined amount of time has passed, the restriction is lifted, i.e., the transition to the control mode is executed (see S150 to S160).

As described above, according to the present embodiment, permissive conditions for transitioning from each of a plurality of control modes to other control modes are set in the database referred to in S120. For example, direct transitions from mode L3 to mode L1 are restricted. In this case, when, for example, the driving assistance apparatus 3 receives a transition instruction for transitioning to mode L1 from the control apparatus 2 while performing driving assistance in mode L3, the apparatus 3 itself can determine the appropriateness of the transition instruction by referring to the aforementioned database. In the present embodiment, the aforementioned transition instruction which is not appropriate is prevented from occurring at least during the predetermined amount of time, rather than being executed immediately. This can be said to be useful in mode transitions where comparatively large changes are imposed on the driver, and particularly in mode transitions which increase the burden on the driver (e.g., a transition from mode L3, in which monitoring is required of the driver, to mode L1, in which no monitoring is required of the driver).

According to the present embodiment as described thus far, the driving assistance apparatus 3 determines whether or not a control mode transition scheme indicated by a transition instruction from the control apparatus 2 has pre-registered details, and when the transition scheme does not have pre-registered details, a transition based on the transition instruction is suppressed. This ensures that unforeseen control mode transitions do not occur without a sufficient preparation period and, as a result, makes it possible to execute appropriate driving assistance and provide a comfortable cabin space. This is even more effective when the details of the driving assistance are diverse and a greater number of control modes are provided as a result. It can therefore be said that the present embodiment is effective both in terms of diversifying the details of driving assistance and improving the usability of the vehicle.

Second Embodiment

Figure 5:
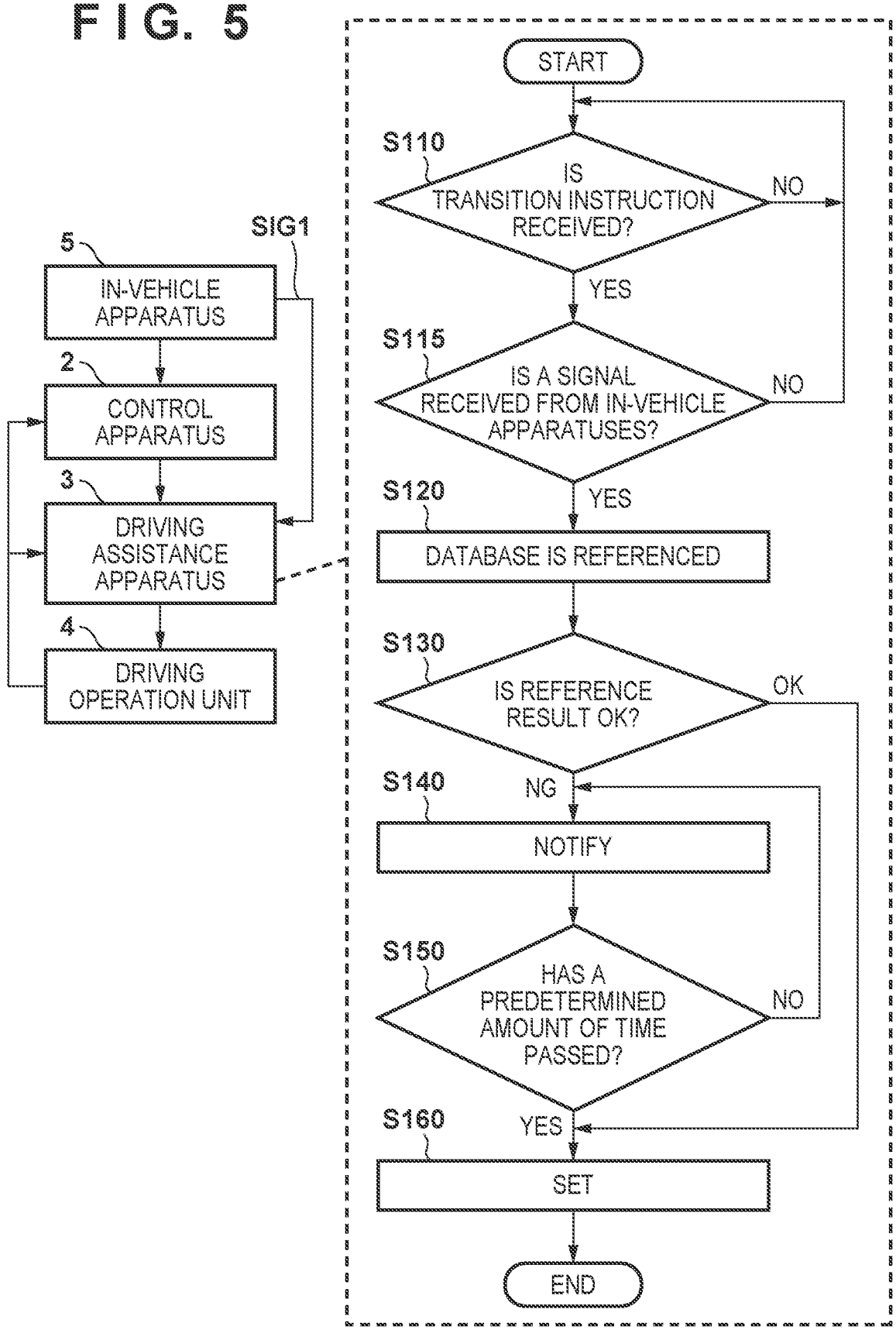
FIG. 5 is a flowchart illustrating an example of control content of a driving assistance apparatus.

FIG. 5 is a flowchart illustrating details of control performed by the driving assistance apparatus 3 according to a second embodiment, in the same manner as in the foregoing first embodiment (FIG. 4). To summarize, in conjunction with or in place of the first embodiment, the apparatus 3 itself determines the appropriateness of the transition instruction from the control apparatus 2 on the basis of the timing at which the transition instruction is output.

For example, permissive conditions for a time for transitioning from a given mode to another mode can be set in the database referred to in S120. Furthermore, to determine whether or not the timing of a received transition instruction is appropriate when the transition instruction is received from the control apparatus 2, the driving assistance apparatus 3 can receive a signal SIG1, which is different from the transition instruction, from the in-vehicle apparatuses 5. Through this, the driving assistance apparatus 3 can determine the appropriateness of the transition instruction on the basis of an amount of time that has passed from when the signal SIG1 is received from the in-vehicle apparatuses 5 to when the transition instruction is received from the control apparatus 2.

As can be seen from FIG. 5, in the present embodiment, S115 is performed after S110 and before S120. When a transition instruction is received in S110, the sequence moves to S115, and in S115, it is determined whether or not the signal SIG1 has been received from the in-vehicle apparatuses 5. In other words, the driving assistance apparatus 3 receives the signal SIG1 from the in-vehicle apparatuses 5 before the transition instruction from the control apparatus 2, and in S120 to S130, the driving assistance apparatus 3 determines the appropriateness on the basis of the time difference therebetween.

For example, when transitioning from mode L3 to mode L2B, the driver is expected to require a predetermined preparation period, and according to the present embodiment, a situation where the control mode transitions earlier than expected can be prevented. As such, the present embodiment can achieve the same effects as in the first embodiment.

Example According to Embodiments

Figure 6:
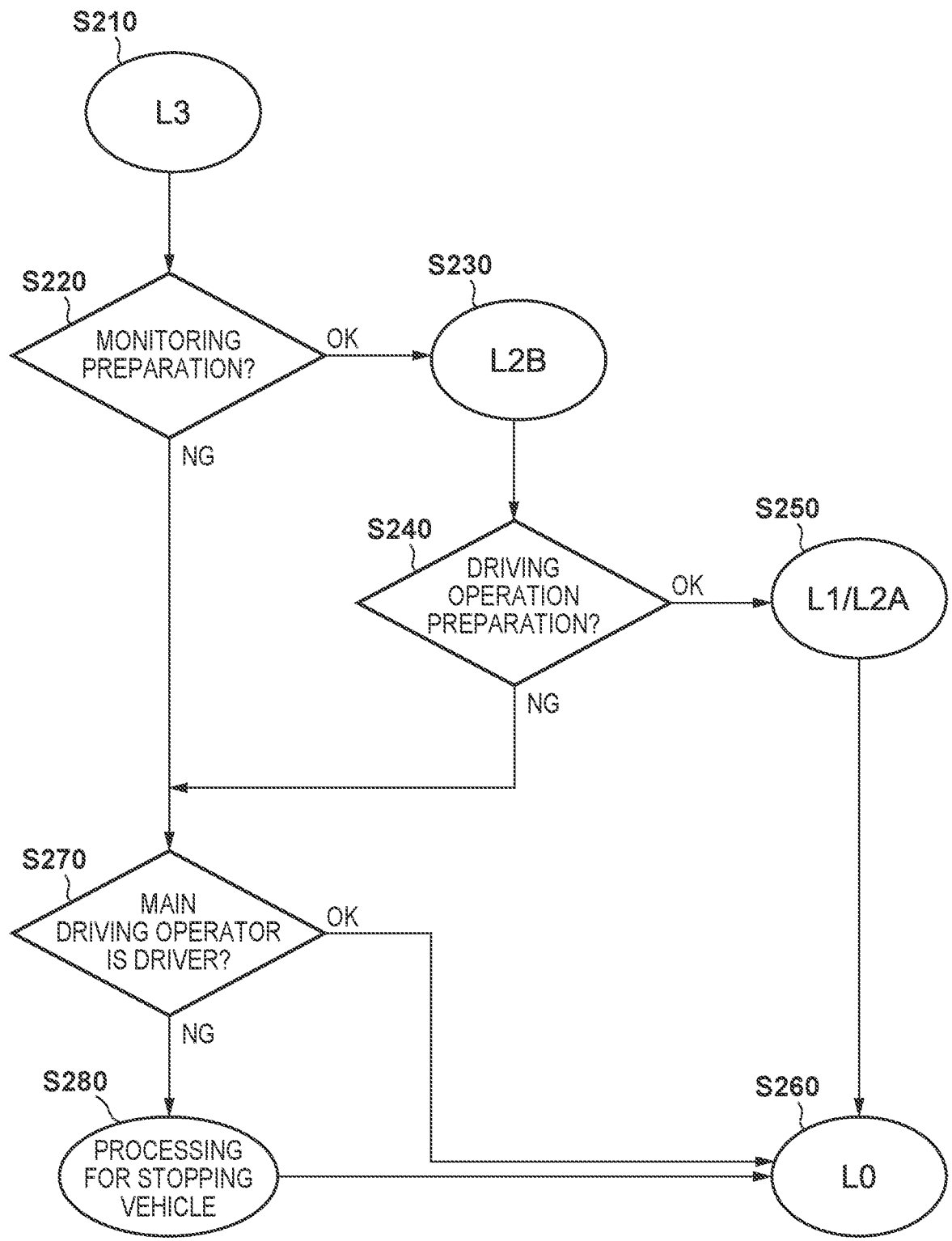
FIG. 6 is a flowchart illustrating an example of control mode transition schemes.

The content of the embodiments is particularly useful for mode transitions which increase the burden on the driver (e.g., a transition from mode L3, in which monitoring is required of the driver, to mode L1, in which no monitoring is required of the driver), i.e., when switching from an automated driving mode to a manual driving mode in the vehicle 1. FIG. 6 is a flowchart illustrating a transition scheme from mode L3 to mode L0, and the state is illustrated as a state transition diagram.

S210 indicates a state of mode L3. The sequence first moves to S220 as the first step for transitioning from mode L3 to mode L0.

In S220, it is determined whether the driver has completed preparations for monitoring (OK) or not (NG). If it is confirmed that the driver has completed preparations for monitoring within a predetermined amount of time (OK), the sequence moves to S230, and if not, the sequence moves to S270. Note that the confirmation of whether or not the preparations for monitoring can be implemented using an in-vehicle camera or the like that monitors the cabin interior, for example.

S230 indicates a state of mode L2B. After S230, the sequence moves to S240 as a step for transitioning to a control mode which has an even lesser degree of driving assistance.

In S240, it is determined whether the driver has completed driving operation preparations (OK) or not (NG). If it is confirmed that the driver has completed driving operation preparations within a predetermined amount of time (OK), the sequence moves to S250, and if not, the sequence moves to S270. Note that the confirmation of whether or not the driving operation preparations are complete can be implemented by the detection apparatus 53.

S250 indicates a state of mode L1/L2A. Between modes L1 and L2A, there are no substantial changes imposed on the driver, and thus there are no substantial restrictions on transitions between those modes. As such, for example, the mode may transition to mode L1 after transitioning to mode L2A, or may transition to mode L1 without transitioning to mode L2A. The sequence moves to S260 after S250.

S260 indicates a state of mode L0. This completes the transition to mode L0.

In S270, it is determined whether the main driving operator has changed from the driving assistance apparatus 3 to the driver. In this example, the preparations for monitoring in S220 are not complete and/or the driving operation preparations are not complete in S240 (a determination of NG is made in S220 and/or S240), and it can therefore be said that quickly transitioning to mode L0 will be difficult. Therefore, in S270, it is determined whether the main driving operator has changed from the driving assistance apparatus 3 to the driver. Note that a request to change the main driving operator from the driving assistance apparatus 3 to the driver can be performed by, for example, emitting a warning sound. If there is a response from the driver within the predetermined amount of time (in this example, if the preparations for both monitoring and driving operations are confirmed), the sequence moves to S260, and if not, the sequence moves to S280.

In S280, processing for stopping the vehicle is performed, i.e., the driving assistance apparatus 3 stops the vehicle 1 at a predetermined position in the travel path (e.g., on the side of the road, such as the shoulder). The sequence then moves to S260, where the shift lever is additionally set to the parking position, for example.

The content of the embodiments can be effectively applied in such cases where a switch from an automated driving mode to a manual driving mode is required in the vehicle 1, and a situation in which an unexpected mode transition occurs in the driving assistance apparatus 3 during the switch can be appropriately prevented as a result.

In the foregoing descriptions, to facilitate understanding, each element is indicated by a name that relates to its functional aspect, but the elements are not limited to elements having the details described in the embodiments as their main functions, and may instead have those details as supplementary functions. In addition, although the present specification describes the vehicle 1 as a typical example, the content of the embodiments can also be applied to moving bodies without wheels (e.g., ships), i.e., can also be applied in a variety of moving bodies equipped with a power source such as an engine.

Summary of Embodiments

The respective features of the embodiments can be summarized as follows.

A first aspect relates to a driving assistance apparatus (e.g., 3), the driving assistance apparatus being an in-vehicle driving assistance apparatus that can execute driving assistance on the basis of any one of a plurality of control modes having mutually-different degrees of driving assistance. The apparatus includes: a receiving unit (e.g., S110) configured to receive a control mode transition instruction; a setting unit (e.g., S160) configured to set the control mode based on the transition instruction; a determining unit (e.g., S130) configured to determine whether or not a transition scheme for the control mode indicated by the transition instruction has a pre-registered detail; and a suppressing unit (e.g., S140, S150) configured to suppress the setting of the control mode by the setting unit when the transition scheme for the control mode indicated by the transition instruction does not have the pre-registered detail. Through this, appropriate driving assistance can be performed without a control mode transition which is unexpected to a driver (including an occupant capable of accessing the driving operation unit 4, in the embodiments) occurring, which makes it possible to provide a comfortable cabin space. It can therefore be said that the first aspect is effective both in terms of diversifying the details of driving assistance and improving the usability of the vehicle.

According to a second aspect, the driving assistance apparatus is installed in a vehicle (e.g., 1) along with a predetermined in-vehicle apparatus (e.g., 5), and the transition instruction is an instruction signal based on an output signal from the in-vehicle apparatus. This makes it possible to more appropriately realize the above-described first aspect.

According to a third aspect, the in-vehicle apparatus includes an information obtaining apparatus (e.g., 51) that obtains information indicating a travel environment of the vehicle, and the transition instruction is an instruction signal based on a result of the obtaining by the information obtaining apparatus. This makes it possible to more appropriately realize the above-described second aspect, based on, for example, position information of the vehicle.

According to a fourth aspect, the in-vehicle apparatus includes a monitoring apparatus (e.g., 52) that monitors a surrounding environment of the vehicle, and the transition instruction is an instruction signal based on a result of the monitoring by the monitoring apparatus. This makes it possible to more appropriately realize the above-described second aspect, based on, for example, an object present in the periphery of the vehicle. Another vehicle, a pedestrian, and the like can be given as examples of the object.

According to a fifth aspect, the in-vehicle apparatus includes a detecting apparatus (e.g., 53) that detects a driving operation by an occupant, and the transition instruction is an instruction signal based on a result of the detecting by the detecting apparatus. This makes it possible to appropriately realize the above-described second aspect even when, for example, an occupant has intervened in driving operations.

According to a sixth aspect, a number of the control modes is at least three, and the pre-registered detail indicates a permissive condition for transitioning from each of the at least three control modes to other control modes. This makes it possible to prevent the occurrence of a control mode transition which is unexpected to the driver.

According to a seventh aspect, the permissive condition includes whether or not it is possible to transition from one of the at least three control modes to another control mode. This makes it possible to more appropriately realize the above-described sixth aspect.

According to an eighth aspect, the pre-registered detail indicates a permissive condition pertaining to a time required to transition from one of the plurality of control modes to another control mode. This makes it possible to prevent the occurrence of a control mode transition which is unexpected to the driver.

According to a ninth aspect, the driving assistance apparatus is installed in a vehicle (e.g., 1) along with a control apparatus (e.g., 2) that makes the transition instruction, the control apparatus makes the transition instruction on the basis of a signal from the predetermined in-vehicle apparatus (e.g., 5), the receiving unit further receives the signal from the in-vehicle apparatus before the transition instruction from the control apparatus, and the determining unit makes the determination on the basis of an amount of time that has passed from when the receiving unit has received the signal from the in-vehicle apparatus. This makes it possible to more appropriately realize the above-described eighth aspect.

According to a tenth aspect, the plurality of control modes include a first mode (e.g., L1 or the like) of performing driving assistance in which monitoring is required of the driver, and a second mode (e.g., L3) of performing driving assistance in which monitoring is not required of the driver, and the permissive condition includes a condition for determining whether or not it is possible to transition from the second mode to the first mode. This makes it possible to prevent the occurrence of a control mode transition which is unexpected to the driver.

According to an eleventh aspect, the driving assistance apparatus further includes a notifying unit (e.g., S140) configured to make a predetermined notification to an occupant when the setting of the control mode by the setting unit has been suppressed by the suppressing unit. This makes it possible for the driver to perform driving preparations quickly.

According to a twelfth aspect, the suppressing unit suppresses the setting of the control mode by the setting unit while the notifying unit is making the notification, and cancels the suppressing after a predetermined amount of time has passed following the start of the notification by the notifying unit. This makes it possible to transition the control mode after the driver has completed driving preparations.

According to a thirteenth aspect, the driving assistance apparatus further includes a recording unit configured to, when the transition scheme of the control mode indicated by the transition instruction does not have the predetermined detail, make a record indicating that the transition scheme of the control mode indicated by the transition instruction does not have the predetermined detail. This makes it possible to refer to content of the recording when making design modifications.

A fourteenth aspect relates to a moving body (e.g., 1), and the moving body includes the above-described driving assistance apparatus (e.g., 3) and a power source. In other words, the above-described driving assistance apparatus can be applied in a variety of moving bodies, including vehicles such as four-wheeled vehicles.

The invention is not limited to the foregoing embodiments, and various variations/changes are possible within the spirit of the invention.

What is claimed is:

1. An in-vehicle driving assistance apparatus that can execute driving assistance on the basis of any one of a plurality of control modes having mutually-different degrees of driving assistance, and that can be installed in a vehicle along with a control apparatus which is configured to make a transition instruction on the basis of a signal from a predetermined in-vehicle apparatus,
the driving assistance apparatus comprising at least one processor circuit with a memory comprising instructions, that when executed by the processor circuit, cause the at least one processor circuit to at least:
  receive the transition instruction from the control apparatus;
  set the control mode based on the transition instruction;
  determine whether or not a transition scheme for the control mode indicated by the transition instruction has a pre-registered detail;
  suppress the setting of the control mode when the transition scheme for the control mode indicated by the transition instruction does not have the pre-registered detail; and
  make a predetermined notification to an occupant when the setting of the control mode has been suppressed, wherein
the pre-registered detail indicates a permissive condition pertaining to a time required to transition from one of the plurality of control modes to another control mode,
the at least one processor circuit further
  receives the signal from the in-vehicle apparatus before the transition instruction from the control apparatus,
  makes the determination on the basis of an amount of time that has passed from when the signal has been received from the in-vehicle apparatus,
  suppresses the setting of the control mode while the notification is being made, and
  cancels the suppressing after a predetermined amount of time has passed following the start of the notification.

2. The driving assistance apparatus according to claim 1, wherein the driving assistance apparatus is installed in a vehicle along with a predetermined in-vehicle apparatus, and
the transition instruction is an instruction signal based on an output signal from the in-vehicle apparatus.

3. The driving assistance apparatus according to claim 2, wherein the in-vehicle apparatus includes an information obtaining apparatus that obtains information indicating a travel environment of the vehicle, and
the transition instruction is an instruction signal based on a result of the obtaining by the information obtaining apparatus.

4. The driving assistance apparatus according to claim 2, wherein the in-vehicle apparatus includes a monitoring apparatus that monitors a surrounding environment of the vehicle, and
the transition instruction is an instruction signal based on a result of the monitoring by the monitoring apparatus.

5. The driving assistance apparatus according to claim 2, wherein the in-vehicle apparatus includes a detecting apparatus that detects a driving operation by an occupant, and
the transition instruction is an instruction signal based on a result of the detecting by the detecting apparatus.

6. The driving assistance apparatus according to claim 1, wherein a number of the control modes is at least three, and the pre-registered detail indicates a permissive condition for transitioning from each of the at least three control modes to other control modes.

7. The driving assistance apparatus according to claim 6, wherein the permissive condition includes whether or not it is possible to transition from one of the at least three control modes to another control mode.

8. The driving assistance apparatus according to claim 6, wherein the plurality of control modes include a first mode of performing driving assistance in which monitoring is required of the driver, and a second mode of performing driving assistance in which monitoring is not required of the driver, and the permissive condition includes a condition for determining whether or not it is possible to transition from the second mode to the first mode.

9. A moving body comprising:

the driving assistance apparatus according to claim 1, and a power source.

* * * * *